(12) United States Patent
Sarchi et al.

(10) Patent No.: US 12,383,375 B2
(45) Date of Patent: Aug. 12, 2025

(54) SELECTIVE COUPLING DEVICE FOR A COLLET CHUCK

(71) Applicant: BIEN-AIR HOLDING SA, Biel/Bienne (CH)

(72) Inventors: Davide Sarchi, Zürich (CH); Myriam Mosimann, Biel/Bienne (CH); Yann Gateau, Biel/Bienne (CH)

(73) Assignee: BIEN-AIR HOLDING SA, Biel/Bienne (CH)

( * ) Notice: Subject to any disclaimer, the term of this patent is extended or adjusted under 35 U.S.C. 154(b) by 757 days.

(21) Appl. No.: 17/437,880

(22) PCT Filed: Mar. 30, 2020

(86) PCT No.: PCT/EP2020/058987
§ 371 (c)(1),
(2) Date: Sep. 10, 2021

(87) PCT Pub. No.: WO2020/201224
PCT Pub. Date: Oct. 8, 2020

(65) Prior Publication Data
US 2022/0168068 A1    Jun. 2, 2022

(30) Foreign Application Priority Data
Mar. 29, 2019 (EP) .................................... 19166221

(51) Int. Cl.
*A61C 1/14* (2006.01)
*A61C 1/05* (2006.01)
*A61C 1/18* (2006.01)

(52) U.S. Cl.
CPC ............... *A61C 1/144* (2013.01); *A61C 1/05* (2013.01); *A61C 1/181* (2013.01)

(58) Field of Classification Search
CPC ..... A61C 1/144; A61C 1/181; B23B 2260/10; B23B 31/2072; B23B 31/38; B23B 2260/0445; Y10T 279/3493
See application file for complete search history.

(56) References Cited

U.S. PATENT DOCUMENTS 2,593,907 A * 4/1952 Marshall ............... F16D 7/02
  279/103
3,321,209 A   5/1967 Sanders
(Continued)

FOREIGN PATENT DOCUMENTS

DE     811250 C  *  8/1951  ............... A61C 1/14
DE    1552233 A1    2/1970
(Continued)

OTHER PUBLICATIONS

DE 811250 C. (Boettcher Erwin) Jig for handpieces, Aug. 16, 1951 [retrieved on Sep. 11, 2024]. Translation retrieved from: Google Patents (Year: 1951).*

(Continued)

*Primary Examiner* — Cris L. Rodriguez
*Assistant Examiner* — Courtney N Huynh
(74) *Attorney, Agent, or Firm* — Tucker Ellis LLP (57) ABSTRACT

A handpiece suitable for dental or chirurgical applications, including a device for clamping a drilling tool, able to be actuated in rotation about an axis of rotation by a drive mechanism. The drive mechanism has a drive shaft rotatable about the said axis of rotation. The clamping device includes a clamp disposed inside the drive shaft for axially securing the drilling tool with respect to the axis of rotation, the clamp co-operating with a plunger for releasing the drilling tool, as well as a radial guide bush of the drilling tool, rotating integrally with the drive shaft. A selective angular coupling mechanism exerting an angular holding torque between the clamp and the guide bush or respectively the drive shaft, the (Continued)

value of which being inferior to that corresponding to the slip threshold between the said clamp and the drilling tool.

14 Claims, 9 Drawing Sheets

(56) References Cited

U.S. PATENT DOCUMENTS

| | | | |
|---|---|---|---|
| 4,378,212 A | | 3/1983 | Waldron |
| 4,573,918 A | | 3/1986 | Bareth |
| 4,874,314 A | | 10/1989 | Fleer et al. |
| 5,383,785 A | * | 1/1995 | Brugger .................. A61C 1/141 433/129 |
| 9,796,014 B2 | * | 10/2017 | Weyland ................. B23B 31/06 |
| 9,849,551 B2 | * | 12/2017 | Ebihara ................... B23B 31/28 |
| 2007/0031786 A1 | * | 2/2007 | Heil ......................... A61C 1/08 433/129 |
| 2007/0087308 A1 | | 4/2007 | Flock et al. |
| 2014/0154642 A1 | | 6/2014 | Bossler |

FOREIGN PATENT DOCUMENTS

| | | |
|---|---|---|
| DE | 4324493 A1 | 2/1994 |
| EP | 0273259 A1 | 7/1988 |
| EP | 1716817 A1 | 11/2006 |
| EP | 2327370 A2 | 6/2011 |
| FR | 2557220 A1 | 6/1985 |
| GB | 1131717 | 10/1968 |
| KR | 100859433 B1 * | 9/2008 ............... B23Q 5/06 |
| WO | 2006130989 A1 | 12/2006 |
| WO | 2008034980 A1 | 3/2008 |

OTHER PUBLICATIONS

KR 100859433 B1 (Ro SK, Park JK, Kyung JH, Shin WC) (Korea Mach & Materials Inst) The Compacted Air Spindle Apparatus, Sep. 23, 2008 [retrieved on Feb. 14, 2024], Translation retrieved from: Espacenet (Year: 2008).*

3D printed emergency collets. Blog entry [online]. Jose Ignacio Romero, Dec. 5, 2018 [retrieved on Feb. 15, 2024]. Retrieved from Archive.org: <URL:https://hackaday.io/project/162534-my-edelstaal-machinex-5/log/156688-3d-printed-emergency-collets> (Year: 2018).*

International Search Report & Written Opinion in PCT/EP2020/ 058987 dated May 18, 2020, 15 pages.

* cited by examiner

SELECTIVE COUPLING DEVICE FOR A COLLET CHUCK

TECHNICAL FIELD

This invention relates to the field of turbines and contra-angles, more specifically to chucking devices for a drilling tool.

STATE OF THE ART

The majority of high-speed dental handpieces on the market, i.e. (air-fed) turbines and multiplier contra-angles (fed by electric motors) are equipped with a system for clamping the drill based on the use of a resilient clamp. This system has been well known for a very long time, in particular the solution as described in the patent document EP0273259B1.

In clamping systems of this type, the rotor shaft (on which and on the outside of which one press-fits either the turbine, in the case of an air turbine, or the transmission pinion, in the case of a contra-angle) driving in rotation the drilling tool contains a clamp and a plunger. The clamp is generally press-fitted and/or welded into the shaft, and it has two functions: that of axially retaining the drill, by means of the flexible elastic ends, and that of guiding the drill radially so as to prevent, in the presence of applied radial load by the dentist during the drilling, the drill from being excessively inclined and able to generate excessive vibrations detrimental to the precision of the work. The plunger is itself partially free in the shaft because it can slide axially in the shaft and in certain cases can turn angularly in the shaft (in the case of a conical plunger); it co-operates with the clamp in the opening phase of the clamp to release the drill when the surgeon-dentist pushes on the release button which covers the plunger. When the clamp is closed and grips the drill, the plunger can be in simple abutment on a surface of the clamp but must never exert an opening force on the resilient parts of the clamp.

In order to prevent, during the drilling and owing to an excessive axial load applied by the surgeon-dentist on the drill, the drill from being able to slide beyond the clamp's jaws toward the cover and block the plunger, making it thus impossible for the user to push the plunger against the applied pressure on the cover and to open the clamp to remove the drill at the end of the work, there exist furthermore perfected clamping systems comprising an additional component which will be referred to as a clamping stop. Such a component is introduced, preferably press-fitted and/or welded or soldered in the shaft on the side of the cover of the head of the handpiece, and it makes it possible to prevent any axial blockage of the plunger. The presence of the clamping stop thus limits the returns to the manufacturer due to a drill that is jammed in the clamp.

Furthermore, in order to be able to optimize the guiding and clamping features of the clamp, there exist moreover systems in which a guide bush is formed separately from the clamp; these two parts then being mutually attached generally by welding or brazing in order to now form only one integral block in rotation with the rotor shaft. In such a case, an additional component is then inserted into the shaft near the exit for the drill. Such a solution makes it possible to use different materials which can be the most suitable for the clamp, requiring flexible and resilient materials in order to clip the rear end of the drill and for the guide bush requiring instead hard and wear-resistant materials.

Nevertheless, none of these state of the art solutions makes it possible to effectively prevent the premature wearing out of the clamp, due to the decoupling between the drill and the clamp during a rotation under load, that is to say when it is being used by the surgeon-dentist. Repeated and prolonged slippage of the drill inside the clamp is perhaps due notably to the sudden jamming of the drill, involving, because of the significant inertia of the rotor, the exceeding of the maximum torque ensured by the clamping.

There thus exists a need for solutions without these known limitations.

SUMMARY OF INVENTION

One object of the present invention is thus to propose a new clamping device which is more effective and makes it possible to minimize the risks of the drill and the clamp slipping during rotation.

Another object of the present invention is to propose a perfected clamping device that nevertheless remains compatible with the heads of standard handpieces, and which does not make the assembly of the button-plunger used for release more complex.

These objects are achieved by means of the features of the main claim, and in particular by means of the selective angular coupling mechanism between the clamp and the guide bush or respectively the drive shaft directly, the selective angular coupling mechanism exerting an angular holding torque between the clamp and the guide bush and/or the drive shaft, the value of which being inferior to that corresponding to the slip threshold between the clamp and the drilling tool.

One advantage of the proposed solution is that it makes it possible to minimize the risk of separation of the drill and clamp and thus to improve considerably the service life of the chucking device.

In a parallel way, the solution proposed makes it possible to improve the reliability of the clamping while minimizing the number of additional components to be introduced in the construction of the handpiece, without having an influence upon the operations of assembly of the latter.

According to a preferred embodiment, the selective angular coupling mechanism uses a magnetic coupling between the clamp and the guide bush such that the force of magnetic attraction between these two pieces makes it possible in a parallel way to position and hold axially the parts in mutual contact without requiring additional parts. According to a preferred variant, a magnetized ring is surmounted and attached to the guide bush as modular piece in order to be able to select more freely the material of the guide bush itself and thus not adversely affect the guiding properties conferred.

According to another preferred embodiment, the selective angular coupling mechanism uses a radial clamping ring integral in rotation with the drive shaft as well as the guide bush, and which would be mounted on a lower part of the clamp via a greasy clamp, i.e. an adjustment not exerting too great a holding torque to allow a relative movement between these two pieces beyond the exertion of a torsion torque going beyond a certain threshold falling within usual operating ranges. In this case, the friction surfaces are preferably radial and cylindrical, and the coupling takes place directly between the clamp and the drive shaft. Moreover, according to a preferred variant for this purely mechanical coupling mode, the shape of the clamp can have a lower collar forming an axial retaining surface, or even a peripheral bead in a more intermediate part, which can then be covered by an additional clamping ring also fulfilling in a supplementary way the function of axial blocking, and otherwise increasing the contact surface for exerting a friction torque, and consequently the adjustment of the value of the holding torque vis-à-vis the clamp.

According to still another preferred embodiment, the plunger is designed in two parts, of which one is fixed in rotation with respect to the drive shaft and thus the guide bush, and the other, co-operating with the clamp, is mounted entirely free in rotation in the drive shaft. Such a variant has the advantage that the clamp can slide for a long time on the bush when these two pieces are made to separate, without however creating a risk of opening of the plunger because of the torsion exerted on the jaws, above all when the latter take the form of two diametrically opposed paws. According to a particularly advantageous variant, the lower part of the plunger, free in rotation in the shaft, is conical.

BRIEF DESCRIPTION OF THE DRAWINGS

The present invention will be better understood with a reading of the description which will follow, given by way of example and with reference to the drawings in which.

DETAILED DESCRIPTION OF THE INVENTION

Within the context of this application, the handpiece in which the clamping mechanism according to the invention can be integrated can consist either of a "turbine", when the drill is driven in rotation under the action of compressed air injected by means of a pipe, or can consist of a "contra-angle" using a drive shaft actuated by a motor.

Figure 1:
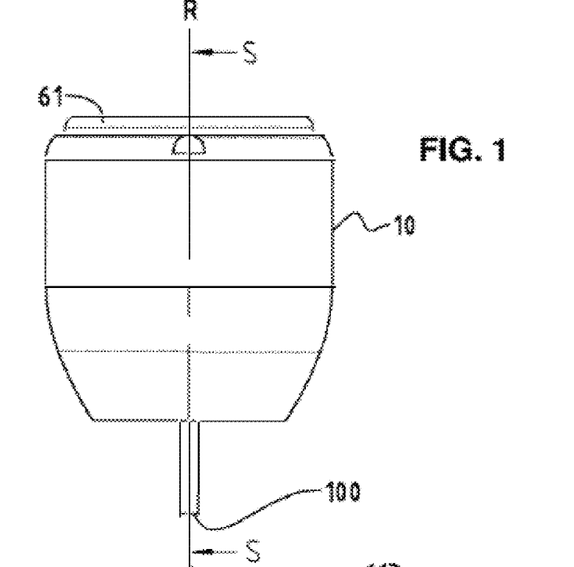
FIG. 1 is a front view of the head of a handpiece provided with a drilling tool according to a preferred embodiment for the present invention.

Illustrated precisely in FIG. 1 is a view of the outside of a handpiece 1, able to consist of a turbine or a contra-angle. It comprises a head 10 at the base of which the drill 100 is inserted, mounted in a way rotating about its axis of rotation R. A push-button 61 covering the head 10 makes it possible in a conventional way to release the drill 100 when pressure is exerted on it by the user of the handpiece, that is to say typically the surgeon-dentist.

Figure 4:
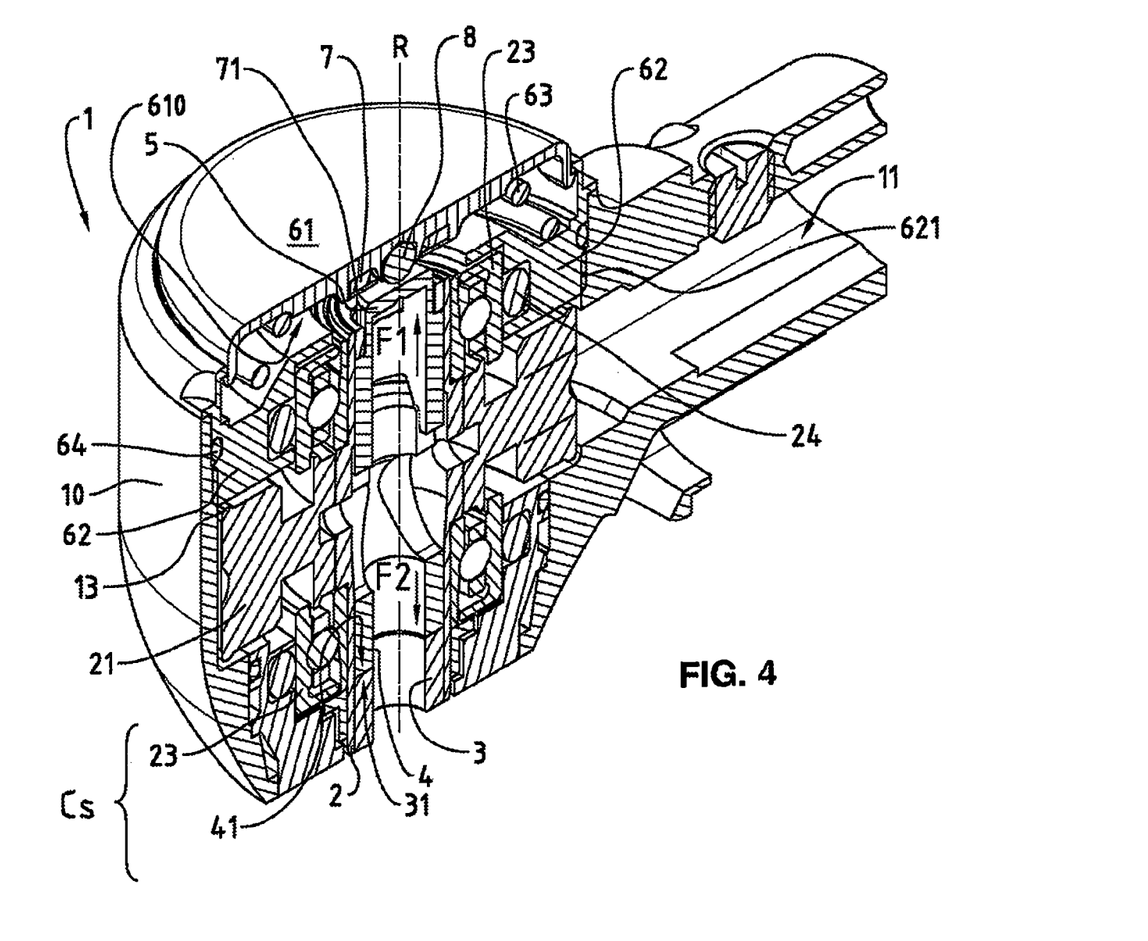
FIG. 4 is a partial sagittal sectional view, in three dimensions, of a handpiece using a turbine rotor provided with a clamping system with selective coupling in rotation according to another preferred embodiment of the present invention.
Figure 5:
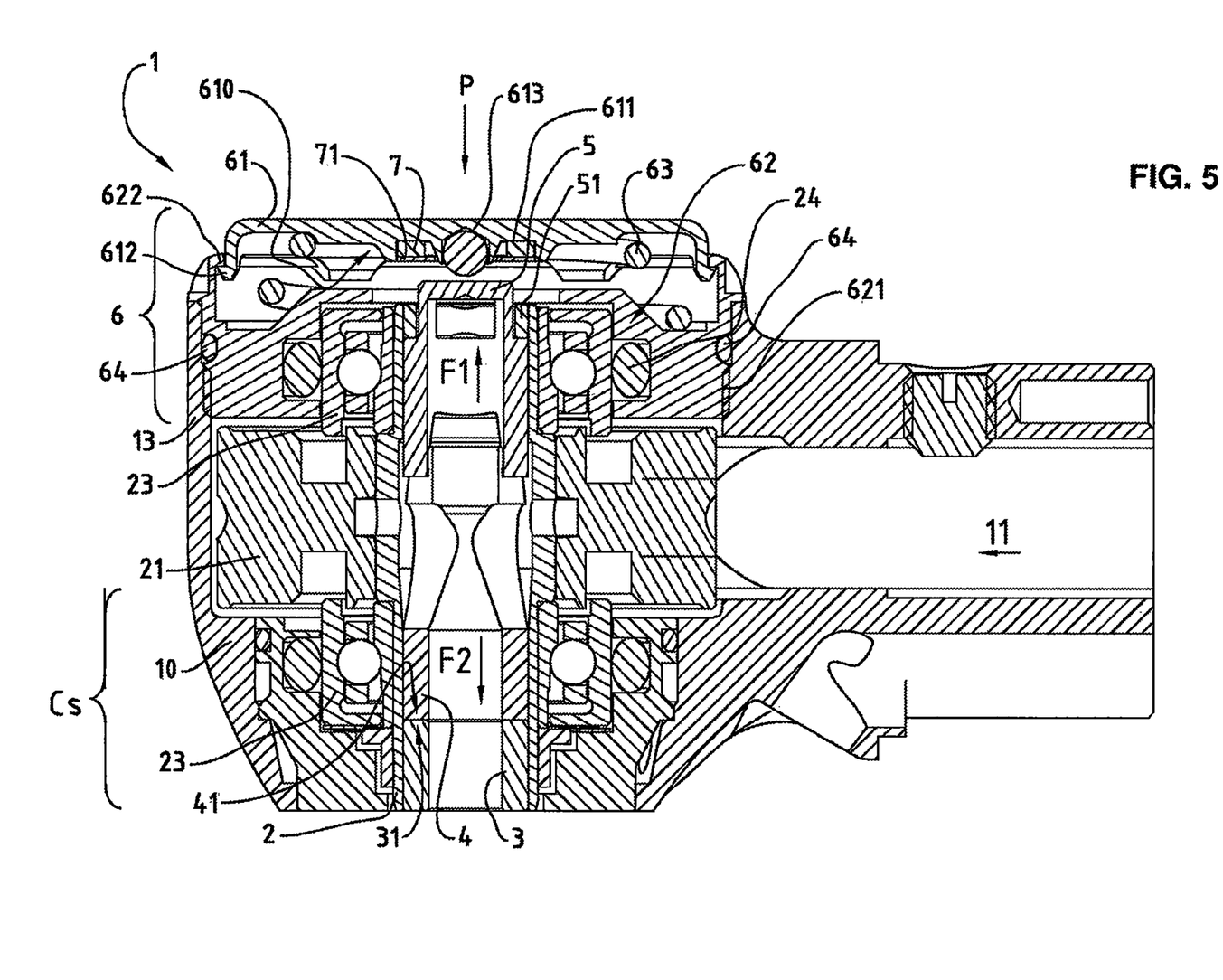
FIG. 5 shows an enlarged sectional view of the handpiece of FIG. 4 in the sagittal plane (S-S)
Figure 6:
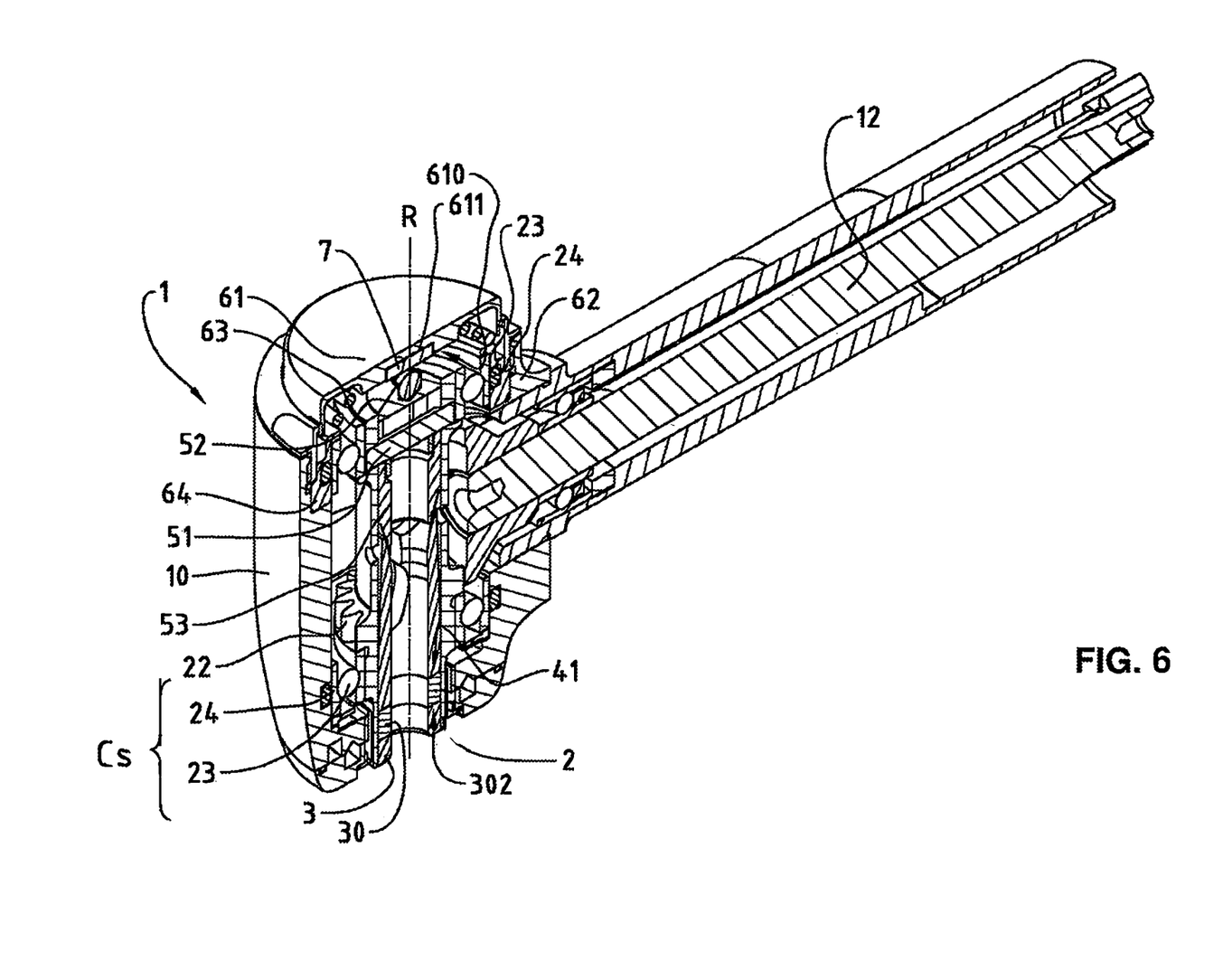
FIG. 6 is a partial sagittal sectional view, in three dimensions, of a handpiece of contra-angle type using not compressed air any more, but instead actuation through a drive motor shaft, and which is provided with a transmission rotor equipped with a system of clamping with selective coupling in rotation, according to still another preferred embodiment of the present invention.
Figure 7:
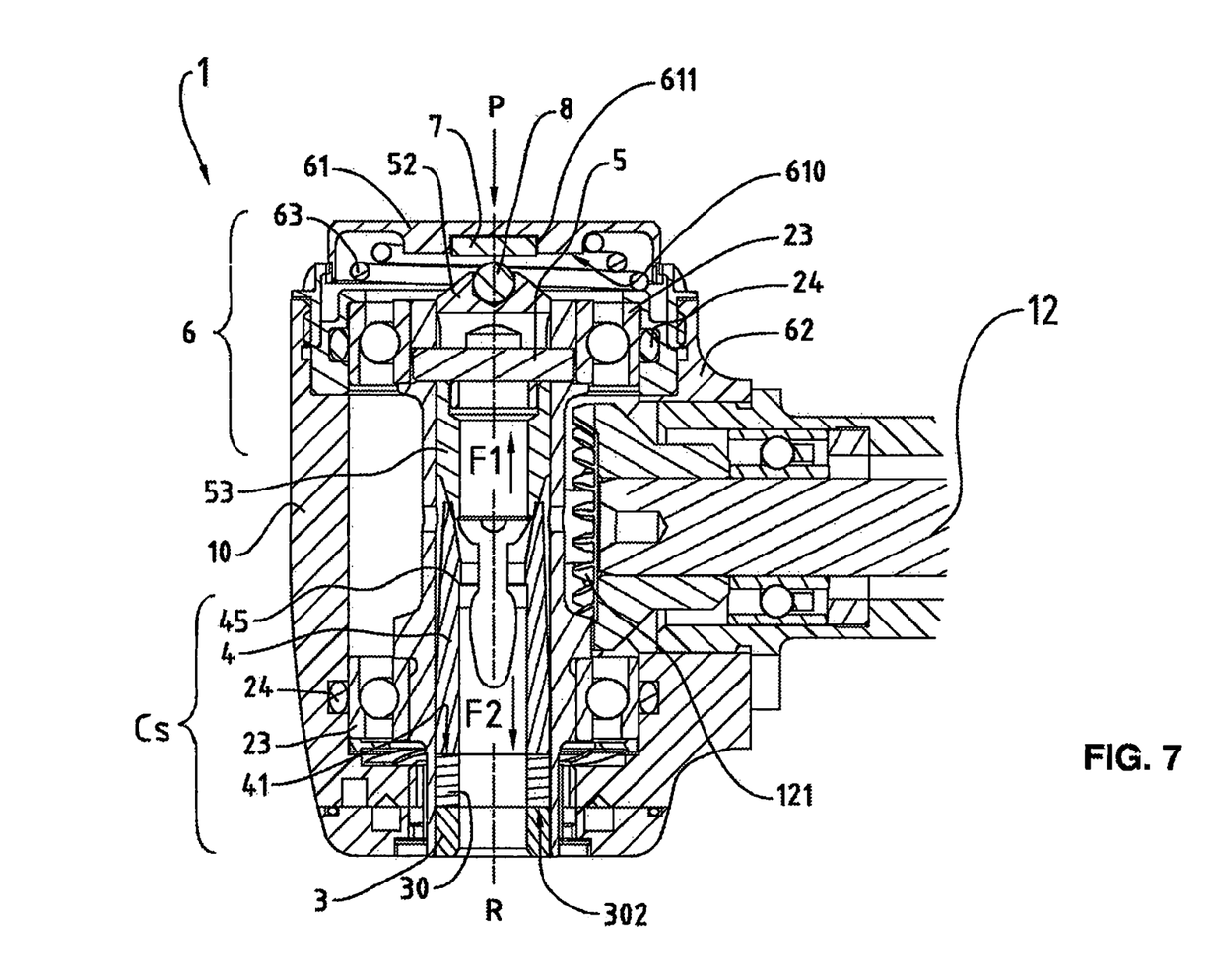
FIG. 7 shows an enlarged sectional view of the handpiece of FIG. 8 in the sagittal plane.

The arrows S-S of FIG. 1 indicate the sagittal cutting plane to be used in following FIGS. 2 to 8 to make it possible to display in more detail the mechanism for mounting and clamping of the drill 100 proposed in the context of the present invention, first of all in the context of a turbine (in FIGS. 2 to 5) then in the context of a contra-angle (FIGS. 6 and 7).

In the following, first of all, a first preferred embodiment connected with a turbine will be described, with reference to FIGS. 2 and 3.

Figure 2:
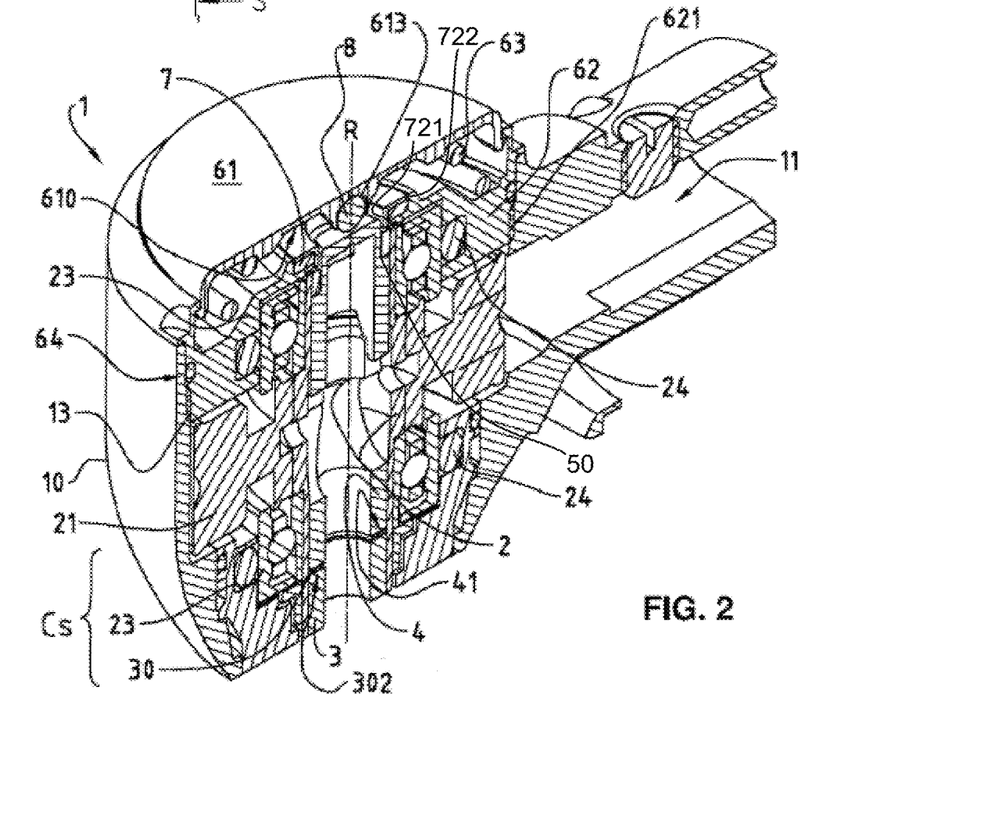
FIG. 2 is a partial sagittal sectional view, along the cutting plane (S-S) indicated in FIG. 1, in three dimensions, of a handpiece using a transmission rotor fitted with a mobile turbine wheel, to which it is often referred to as a "turbine rotor" provided with a clamping system with selective coupling in rotation according to a preferred embodiment of the present invention.

FIG. 2, which consists of a partial sagittal sectional view in three dimensions of a handpiece 1 along the cutting plane (S-S) indicated in FIG. 1, makes it possible to distinguish the different usual elements of a head 10 and of a clamping mechanism for the drill 100—not shown however for the sake of clarity—comprising notably the pipe for supply of compressed air 11 on the right in the Figure, driving the turbine wheel 21, itself integral in rotation with a drive shaft 2 for the drilling tool 100, which is commonly referred to as being "the rotor shaft". On the drive shaft 2 here are inserted two bearings 23, preferably ball bearings, themselves squeezed by respective gaskets of O-ring type 24. Mounted in the drive shaft 2 are respectively the axial retaining clamp 4 for the drill—the jaws of which are not visible in this figure, but better seen in FIG. 7 relating to a corresponding embodiment for a contra-angle—and the radial guide bush 3, these two pieces being separated in order to be able in particular to adjust the materials used for the clamp 4 to those of the guide bush 3. Therefore, whereas the clamp 4 requires preferably resilient and deformable materials, the bush 3 requires, for its part, preferably very hard materials, so as to be wear-resistant and to ensure excellent features for guiding along the axis of rotation R for as long a time as possible.

Inserted in the upper part of the head is a piece for holding the push-button 61, which is provided to release the drill 100. This holding piece consists, according to the preferred embodiment described, of a nut 62 screwed in the head by means of a threaded bead 621 at its outer periphery, co-operating with an internal threading 13 made in the head 10; a sealing gasket 64 is provided, where these two screwing surfaces co-operate, to ensure the repeatable positioning of the nut and of the push-button and, in the case of a turbine, to thus stabilize the aerodynamic flows exiting from the head. Disposed on top of the retaining nut 62 is a spring 63 making it possible to bring the push-button 61 back into its resting position, as represented in FIGS. 2 and 3, where a peripheral radial engagement part 612 of the push-button is kept in contact against an inner peripheral retaining lip 622, the co-operation of the engagement parts being in evidence in FIG. 3.

In FIG. 2, one can likewise distinguish, at the lower face 610 of the push-button 61, an anti-heating ball 8, made of a material of low thermal conductivity provided for this purpose, and which is preferably press-fitted directly into a central accommodation 613 provided in the push-button 61, here of hexagonal cross section in order to minimize the heat transfer thermal bridges towards the push-button 61.

The push-button module 6, formed by the nut 62 and the push-button 61, as well as the compression spring 63 interposed between the two, is illustrated later in FIG. 3. In FIG. 2, the plunger 5 can now be distinguished, with which the push-button 61, or here more precisely the ball 8, can be brought into contact when a pressure is exerted in the direction P, visible in FIGS. 3 and 4, and a permanent clamp magnet 7 arranged in the nut 62. In the context of the present invention, the plunger 5 is made of a passive ferromagnetic material, in such a way as to co-operate with the permanent clamp magnet 7.

For a turbine, the transmission rotor is then made of the turbine wheel as an input element, and of the drive shaft 2 as an output element, as well as the bearings 23, the clamp 4, the plunger 5 and the guide bush 3.

For a contra-angle, the transmission rotor is made of a drive pinion 22 (which replaces the turbine wheel 21) as input element the drive shaft 2 as output element, as well the bearings 23, the clamp 4, the plunger 5 and the guide bush 3.

The available power to the rotor, and hence the torque and speed thereof, depends on the handpiece in which the rotor is integrated, as well as the pipes of the compressed air supply network (in the case of a turbine) or the motor and the control electronics thereof (in the case of the contra-angle). The torque supplied to the drive shaft 2 also depends on the rotation speed of the transmission rotor, which in turn depends from the torque applied to the drill (in the case of a turbine) or the rotation speed imparted to the motor (for the contra-angle), because the transmission rotor efficiency decreases heavily as the speed increases (and approaches zero at maximum speed, in the case of a turbine). However, in both cases, as well for the turbine as for the contra-angle, the maximum torque that can be supplied to the drive shaft depends solely from the input component (the turbine wheel 21 or the drive pinion 22, respectively), from friction et the bearing's 23 efficiency and the mechanical connection 0 between the input component and the drive shaft 2 (the supplied torque cannot exceed the breaking limit of this mechanical connection).

For example, for a turbine, the maximum torque that can be supplied to the drive shaft 2 (independently from geometrical configuration of the handpiece in which the rotor is integrated and the available air pressure) is determined by the bearing's 23 efficiency, the diameter and the height of the turbine wheel, and the number and the shape of the blades of the turbine wheel 21.

For a contra-angle, the maximum torque that can be supplied to the drive shaft 2 (independently from geometrical configuration of the handpiece in which the rotor is integrated and the available motor power), is determined by the bearing's 23 efficiency, the number, the material and the shape of the teeth of the drive pinion 22.

Further in view of these technical limitations, the maximum torque CTr that can be transmitted and supplied to the drive shaft 2 via the transmission rotor is comprised within 2 to 6 mNm if the rotor is integrated into a turbine whereas it can generally reach 10 mNm if the rotor is integrated into a contra-angle connected to a motor rotating at a speed below 20'000 rpm.

In the following, reference will be made equally to FIG. 3, taking the same elements as FIG. 2, previously described, in the sagittal plane S-S, and which represents the different elements of the perfected clamping device according to the invention in an enlarged view. The description of the references common to all these figures will not be systematically repeated.

Figure 3:
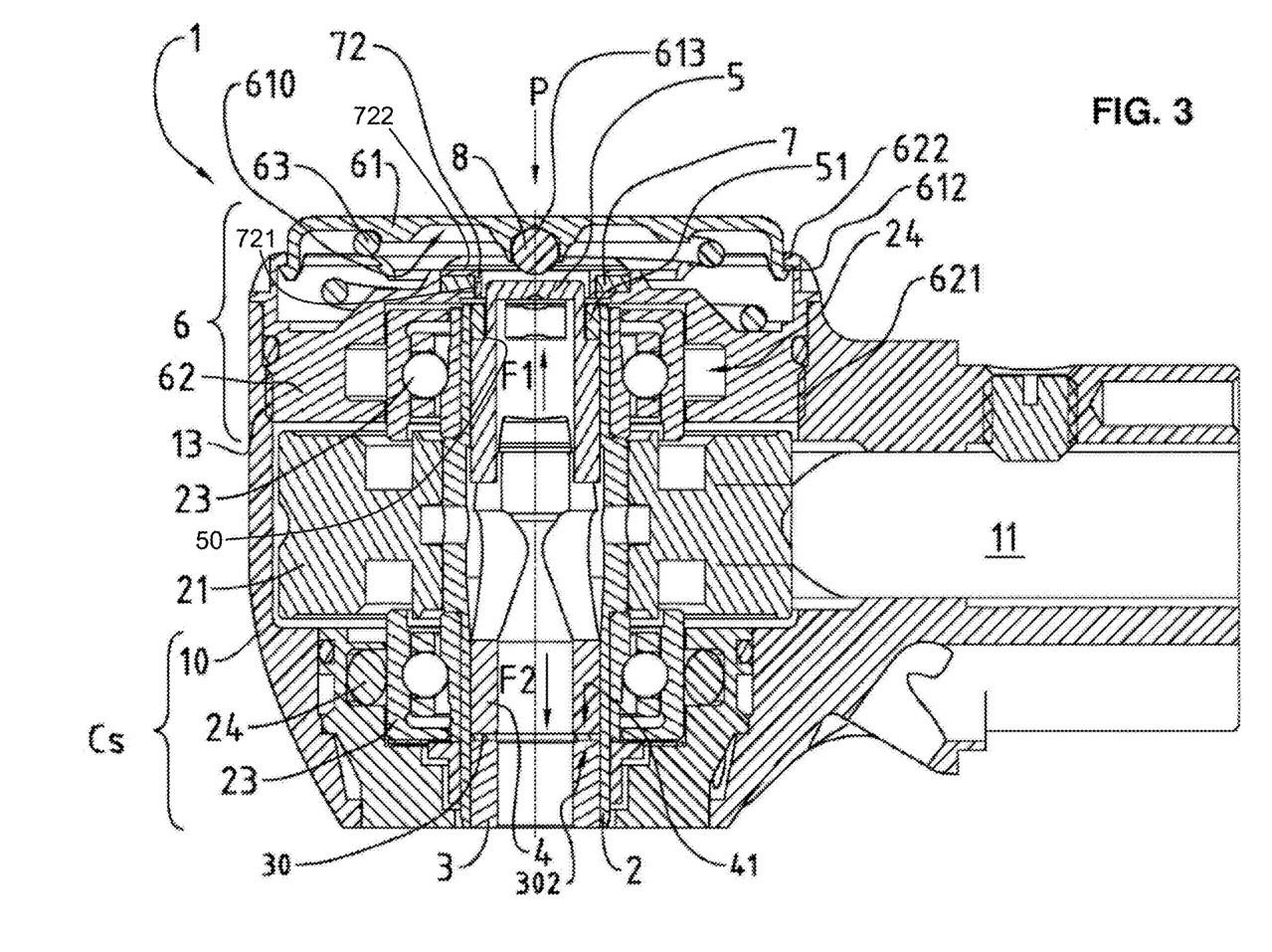
FIG. 3 shows an enlarged sectional view of the handpiece of FIG. 2 in the sagittal plane (S-S)

In FIGS. 2 and 3, it can be noted that a permanent clamp magnet of annular shape 7 is positioned in the retaining nut 62 of the push-button 61 with the aid of a retaining piece 72 having a cylindrical part 721 and an axial retaining collar 722. This piece can be fixed in any manner to the nut 62, for example by press-fitting, welding or soldering, or even screwing, and it can be noted that the positioning of the magnet 7 of annular shape radially extends beyond the casing of the plunger 5, which has moreover peripheral shoulders 50 in order to be able to position the clamping stop 51. This clamp magnet 7 is magnetized in the axial direction, and thus exerts permanently a force of attraction directed substantially upward on the partner ferromagnetic element, that is to say the plunger 5 of the clamping device. The force of magnetic attraction $F_1$ is indicated by the arrow in FIG. 4 illustrating the fact that the plunger 5 is kept in upper position in the direction of the push-button 61. In conditions of use, that is to say during the rotation of the drive shaft 2 and the drilling, this magnetic force of attraction $F_1$ makes it possible to flatten the plunger 5 against the clamping stop 51, and thus prevents the plunger 5 from jamming in the clamp 4 and the latter from opening accidentally.

The permanent clamp magnet 7 is, in the context of the present invention, preferably of annular or cylindrical shape, that is to say having a form of revolution about the axis of rotation R of the drill. According to the embodiment illustrated by FIGS. 2 to 4, the fact that the permanent clamp magnet 7 is positioned in the nut 62 has as a consequence to bring the latter as close as possible to its partner ferromagnetic element, i.e. the plunger 5, and thus to maximize the strength of the magnetic force $F_1$ making it possible to hold it effectively in its "high" position, i.e. where the plunger is held in contact against the clamping stop 51.

This implementation according to which the permanent clamp magnet 7 is fixed and situated in the retaining nut 62 of the push-button 61 has moreover an additional technical advantage of reliability. In fact, when opening the clamp, the push-button 61 is pressed by the user in direction P, to plunge the plunger 5 inside the clamp 4 and thus open the resilient sleeves of the clamp 4: in this case, the user must overcome not just the holding force of the compressed spring 63 between the nut 62 and the push-button 61, but also the magnetic force $F_1$ between the plunger 5 and the permanent clamp magnet 7, which adds supplementary security with respect to accidental pressing of the push-button 61 on the part of the user.

In order to prevent any premature attrition of the clamp 4, due to the separation of the drilling tool 100 from the clamp 4 during a rotation under load, notably owing to a sudden blockage of the drill involving, because of the significant inertia of the rotor, the surpassing of the maximum torque ensured by the clamping, a selective angular coupling device $C_s$ is proposed in the context of this invention between the clamp 4, and the guide bush 3, formed by two separate parts, assembled in removable fashion and reversible, the one with respect to the other, in order to make possible in a precise way a disengagement of the clamp 4 in relation to the guide bush 3 before the drilling tool 100 is itself made to turn in the clamp 4. Another functional constraint of such a system of modular mounting of the clamp 4 on the bush 3 is to ensure that the clamp never disengages angularly from the bush irrespective of the torque applied at the input of the drive shaft. In other words, the proposed selective angular coupling mechanism $C_s$ must exert an angular holding torque C between the clamp 4 and the guide bush of which the value ranges between that corresponding to the maximal transmission torque $C_{Tr}$ of the said drive mechanism and that corresponding to the slip threshold between the said clamp 4 and the said drilling tool 100, which can be summed up by the following inequality:

$$C_{Tr} < C < C_{glis}$$

In practice, considering that the slip threshold between the clamp 4 and the drilling tool 100 is on the order of 20 to 30 mNm, and, as illustrated above, that the maximum couple $C_{Tr}$ provided to the drive shaft 2 via the transmission rotor is on the order of 2 to 6 mNm for a turbine and rather on the order of 10 mNm for a contra-angle, the angular holding torque (C) will preferably range between 4 mNm and 20 mNm.

Assuming that the transmission rotor is generally a spare part for turbines and contra-angles (i.e. it is hence possible to replace only the transmission rotor when it is worn out, as a repair service carried out by after sale service operator or, in certain cases, directly by the user himself), it is advantageous to use the same transmission rotor to equip several models and types of turbine or models of contra-angle having a different gearing ratio and/or et/ou efficiency. In such a situation, during the conception of the transmission rotor, only the sliding friction force/torque between the clamp and the drilling tool is known (thanks to the fact that the drilling tools are normalized), whereas the maximum torque supplied to the drive shaft is not specified. In that case, considering the torque range values defined above, the transmission rotor and the clamping system according to the invention should be designed such as the angular holding torque complies with the following constraint:

$$C_{glis}/2 < C < C_{glis}.$$

This criterion allows to ensure a reliable operation of the clamping system integrated into a universal transmission rotor, i.e. that can be used in several turbine or contra-angle models.

In the embodiment illustrated by FIGS. 2 and 3, the coupling mode used by the selective angular coupling mechanism $C_s$ is of magnetic type, which makes it possible not only to ensure the mutual coupling in rotation between the guide bush 3 and the clamp 4, but also to ensure their axial positioning without requiring the addition of any other piece to achieve this latter function. In these figures, it can be noted that the guide bush 3 is surmounted by a permanent magnet of annular shape—the magnetized coupling ring 30—which can be press-fitted and/or brazed and/or welded or soldered directly in the drive shaft 2, or even brazed and/or welded or soldered to the guide bush 3 via its lower fixation surface 302, placed on the axial end of the guide bush 3. The guide bush 3 is always united with the drive shaft 2—for example by press-fitting—whereas the clamp 4, on the contrary, is not press-fitted in the drive shaft 2, but is free to turn about the axis of rotation R of the drilling tool 100.

This magnetized coupling ring 30 is magnetized in axial direction and thus exerts permanently a force of magnetic attraction $F_2$ directed downward on the partner ferromagnetic element, which in this case consists of the chucking clamp 4. In addition to the torque of magnetic origin, a torque of mechanical origin—due to mechanical friction between the pieces at the coupling surfaces—is exerted by the magnet on the clamp 4, opposing the rotation of the clamp 4 in relation to the guide bush 3. Thus the angular holding torque C between the clamp 4 and the guide bush 3 results at least partially from the friction between the lower axial coupling surface 41 of the clamp 4 and the upper axial coupling surface 31 of the guide bush 3.

An advantage of this embodiment is that the guide bush 3 and the permanent magnet formed by the magnetized coupling ring 30 can be produced in two different materials, favoring hardness for the guide bush 3 and magnetic saturation for the magnet: for example, the guide bush could be made of non-magnetic hard metal (CVV), and the magnet of SmCo, which is, on the contrary, a not particularly hard, and fragile material.

From a functional point of view, during drilling work, the drilling torque applied to the drilling tool 100 is transmitted to the clamp 4: in the case where the drilling tool 100 is accidentally blocked by a ruggedness of the drilled material, the sudden torque exerted on the clamp 4 increases considerably because of the inertia of the drive shaft 2, which does not manage to stop sufficiently quickly at the time of the shock sustained by the drilling tool 100. In this case, the sudden torque applied on the clamp 4 by the drilling tool 100 exceeds the angular holding torque C exerted by the guide bush 3 on the clamp 4, which causes a slipping of the assembly (clamp 4—drilling tool 100) in relation to the guide bush 3. The fact that the decoupling of the assembly (clamp 4—drilling tool 100) from the guide bush 3 occurs before the drilling tool 100 is decoupled from the clamp 4 makes it possible to protect against instances of wear and tear caused by the friction of the drilling tool 100 in the clamp 4.

Another important property of the clamping system according to the invention can easily be understood with the present preferred embodiment: following the phenomenon having caused the uncoupling and separation of the (clamp 4—drilling tool 100) unit from the guide bush 3 and/or the drive shaft 2, the selective coupling between the clamp 4 and the guide bush 3 and/or the drive shaft 2 is restored without any damage, wearing or any kind of degradation, i.e. the holding torque is not altered after an uncoupling of components. In practice, the occurrences of this temporary uncoupling of the (clamp 4—drilling tool 100) unit from the guide bush 3 and/or the drive shaft 2 has no negative impact on the clamping system's and the transmission rotor's lifetime. The uncoupling phenomenon cannot even be perceived directly by the user.

FIGS. 4 and 5 illustrate another preferred embodiment of the present invention, once again relating to a turbine.

According to this embodiment, the device for driving the drill 100 is in all points identical to that of the previously described embodiment and illustrated by FIGS. 2 and 3; consequently, all the reference numerals introduced in the context of these figures will not be explained again.

However, the device for clamping the drill 100 has a different arrangement of the permanent magnet 7, which this time is no longer integrated in the nut 62, but directly in the push-button. In other words, as can be noted in FIG. 5, a permanent clamp magnet 7 of annular shape is arranged this time around the accommodation 613 of the anti-heating ball 8, in a recess 611 in the lower face 610 of the push-button 61. It is held in position inside the recess of the push-button 61 by an axial retaining washer 71, preferably welded or soldered or glued to the push-button 61. The partner ferromagnetic element of the magnet is once again the plunger 5, represented in FIGS. 4 and 5 in the "high" position, that is to say held in contact against the clamping stop 51 by means of the force of magnetic attraction $F_1$ indicated by the arrow visible in FIG. 7, and this tends to pull the plunger 5 upward.

The functioning mechanism is similar to that of the preceding embodiment in rotation/drilling mode, where the plunger is brought upward following the magnetic force of attraction $F_1$ exerted by the magnet. However, a major difference can be noted when there is pressure on the push-button 61, this pressure indicated by the arrow Pin FIG. 5. In other words, during such a phase of pressure on the push-button 61, the magnetic attraction will this time favor a downward movement of the push-button 61 because of the distance between the permanent clamp magnet 7 and the plunger 5, which decreases when the push-button approaches the plunger 5. Consequently, therefore, the intensity of the pressure P which must be applied by the user is less than that in absence of the magnet, whereas it was increased in the preceding case.

However, since in the embodiment of FIGS. 4 and 5, the permanent clamp magnet 7 is located in a position more remote from the plunger 5 than in the embodiment of FIGS. 2 and 3, the force of magnetic attraction $F_1$ exerted on the plunger 5 will be less, in a way equal to dimensions of the permanent clamp magnet 7 and of the plunger 5. This last embodiment of FIGS. 4 and 5 is, in contrast, easier to achieve because a simple washer can be used to line the permanent clamp magnet. Moreover, in order to increase the magnetic force exerted on the plunger 5, it would be possible furthermore to make the axial retaining washer 71 likewise in a ferromagnetic material, along with the anti-heating ball 8, for example in tungsten carbide with a content of 30% cobalt.

In a particularly advantageous variant of the embodiments illustrated in FIGS. 2 to 5, the clamping stop 51 is also free to turn in the drive shaft 2, like the clamp 4. In other words: this clamping stop 51 is not press-fitted and/or welded or soldered, which makes it possible to withstand particularly long transient conditions during which the clamp 4 slides on the guide bush 3 without the risk of having the plunger 5 being able to force the opening of the clamp 4 through the exertion of forces resulting in a torsion torque on the clamping jaws. In this case, the clamping stop 51 is placed in the drive shaft 2 and the crimping of the upper periphery of the drive shaft 2 ensures that the clamping stop 51 cannot exit axially from the drive shaft 2.

According to a variant illustrated by FIGS. 6 and 7 which follow, relating to a contra-angle, the permanent clamp magnet 7 could also take the form of a disk or a pad positioned inside the push-button, but behind the anti-heating ball 8. In such a case, the thickness of the permanent clamping magnet 7 could also be increased in a considerable way so that an increased force of magnetic attraction $F_1$ results.

FIGS. 6 and 7 show a different embodiment of the rotor shaft, that is to say the drive shaft 2, with respect to the turbine in preceding FIGS. 1 to 5, this time with the aid of a gearing 121 between the motor shaft 12, driven by an electric motor, and the drive pinion 22 replacing the turbine wheel in the transmission rotor. The plunger 5 is from now on achieved in two parts, with an upper part 52 of the plunger 5 which is integral in rotation with the drive shaft 2, because of the clamping stop 51 formed by a transverse pin, and a lower conical part 53 free in rotation with respect to the drive shaft. The permanent clamp magnet 7 formed by the pad disposed in the recess 611 of the lower face 610 of the push-button 61 is from now on able to come into contact with the anti-heating ball 8, provided this time no longer directly in an accommodation of the push-button 61, but on the upper part 52 of the plunger 5.

As can be seen in FIG. 7, which is an enlargement of FIG. 6 in the sagittal cutting plane S-S, the jaws 45 of the clamp 4 hold axially the drill 100 (not shown so that other parts can be seen more easily) while the lower conical part 53 does not spread them when a pressure is exerted on the push-button 61 toward the inside of the head 10, conforming to the direction of the arrow with the reference symbol "P". In such a case, the passive magnetic element associated with the permanent clamp magnet 7 accommodated in the recess 611 arranged on the lower face of the push-button 61 consists precisely in at least the lower conical part 53, and, because of the axial remoteness of this piece with respect to the permanent clamp magnet 7, potentially also the upper part of the plunger 5.

In the contra-angle illustrated by FIGS. 6 and 7, it can be noted that the embodiment of the selective angular coupling mechanism $C_s$ is similar to that of FIGS. 2 and 3, involving a magnetic mode of coupling and where a magnetized coupling ring 30 is interposed between the guide bush 3 and the clamp 4. All the references explained in detail in the context of the description of FIGS. 2 and 3 will therefore not be repeated here.

However, as explained above, the plunger 5 is from now on divided into two parts with an upper part 52, blocked in rotation by a transverse pin used as clamping stop 51, and a lower conical part 53, free in rotation in the drive shaft 2, which also makes it possible to avoid forcing the opening of the jaws 45 of the clamp 4 through the exertion of a torsion torque, and avoid causing attrition of the plunger 5 owing to friction which would occur if the clamp 4 were to turn in the drive shaft, ultimately resulting in a slight inclination of the plunger 5 and consequently its blockage in the axial direction.

Described in the preceding has been the realization of magnetic couplings for the selective angular coupling mechanism $C_s$, which has the following advantages:
 exploiting non-contacting forces, which reduces or eliminates the effects of attrition;
 ensuring the effectiveness of the technical solution independently of geometric constraints;
 minimizing the number of additional components to be introduced in the construction of the handpiece;
 not making the operations of assembly more complex with respect to typical constructions.

However, in the scope of the present invention, a purely mechanical coupling can also be achieved, i.e., through friction coupling, in particular via a ring of Teflon or bronze, inserted and press-fitted in the drive shaft and inside of which the clamp 4 is press-fitted with a slight force of press-fit (also called "greasy press-fit", which makes it possible to ensure relatively little retaining torque of the clamp).

Figure 8:
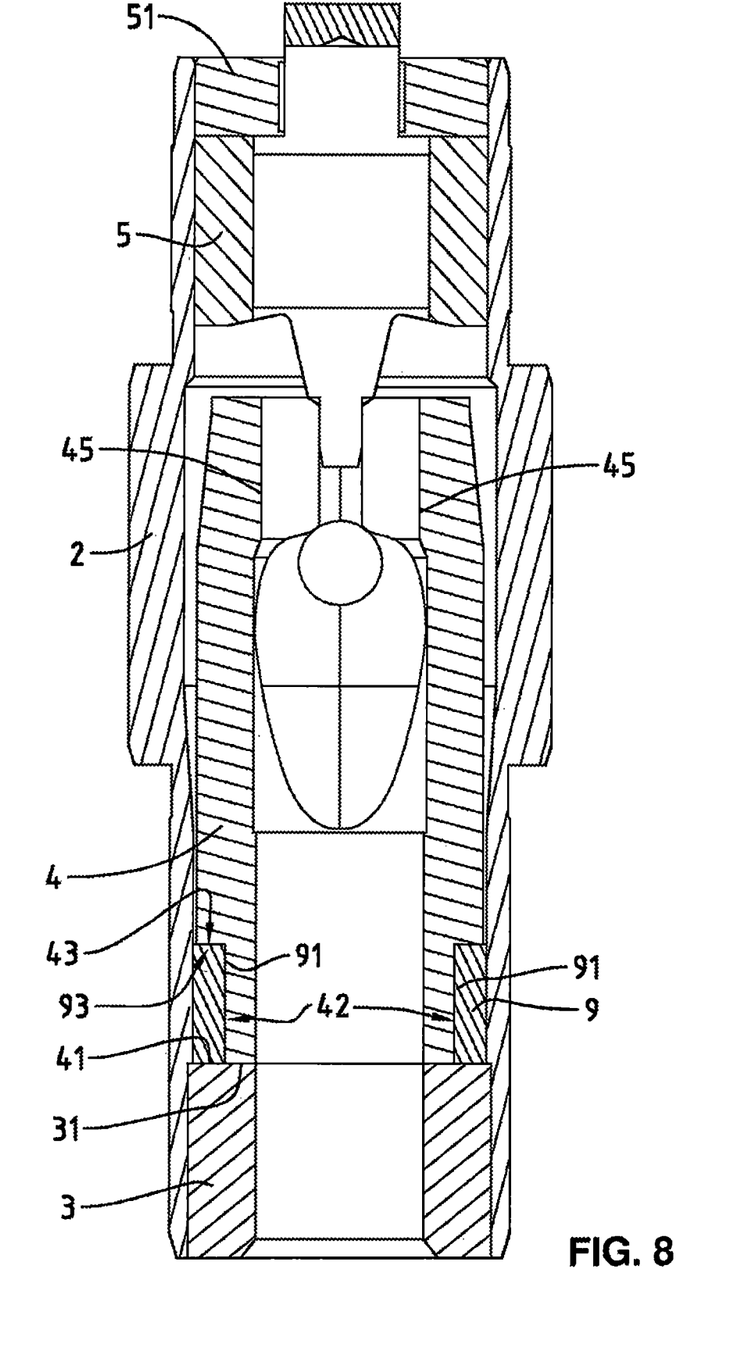
FIG. 8 shows a detail of a purely mechanical selective coupling mechanism according to another preferred embodiment of the present invention, once again according to a sagittal sectional view.
Figure 9:
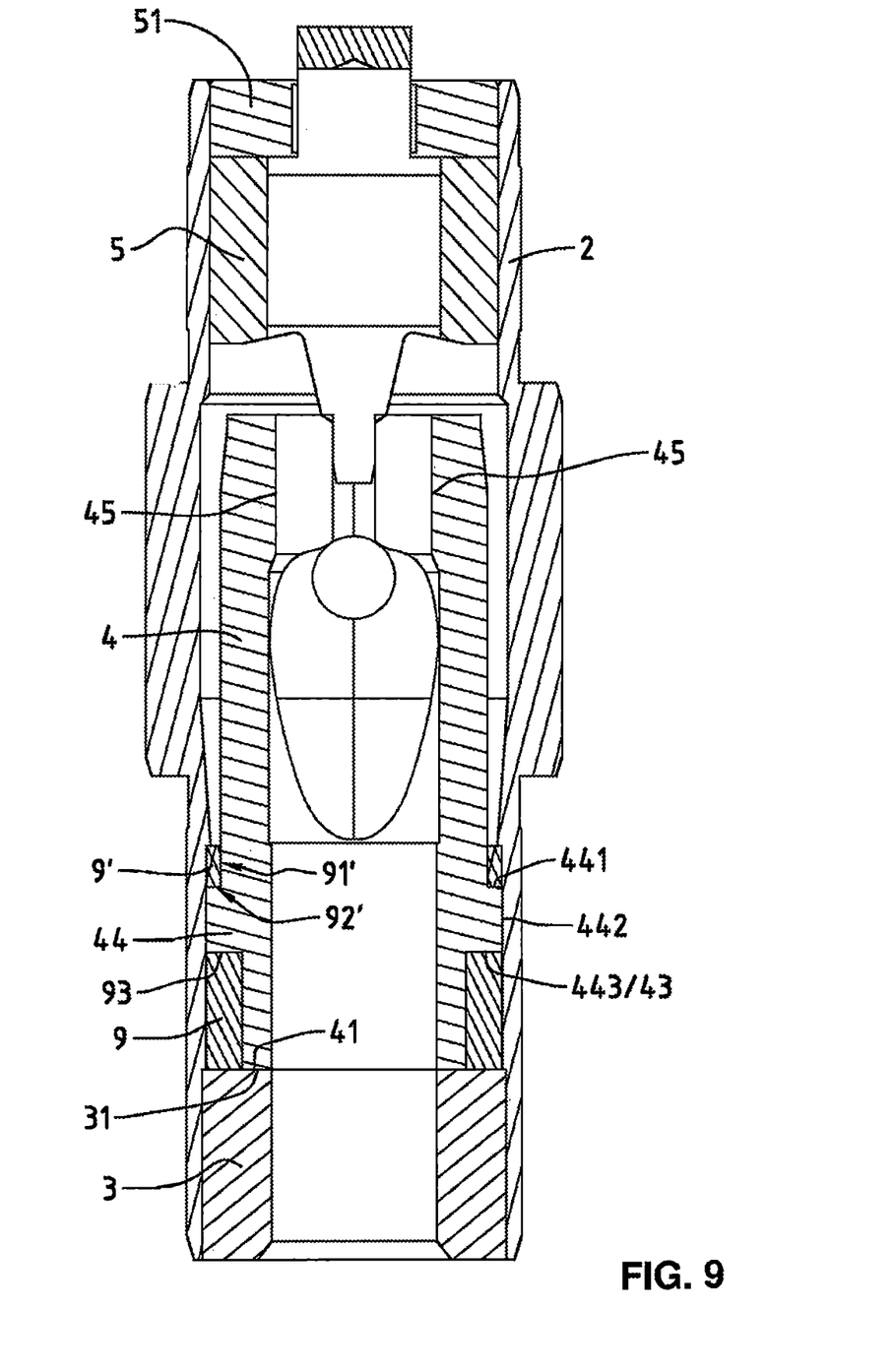
FIG. 9 shows a detail of a selective coupling mechanism according to still another preferred embodiment of the present invention according to the same sagittal section view as FIG. 8.
Figure 10:
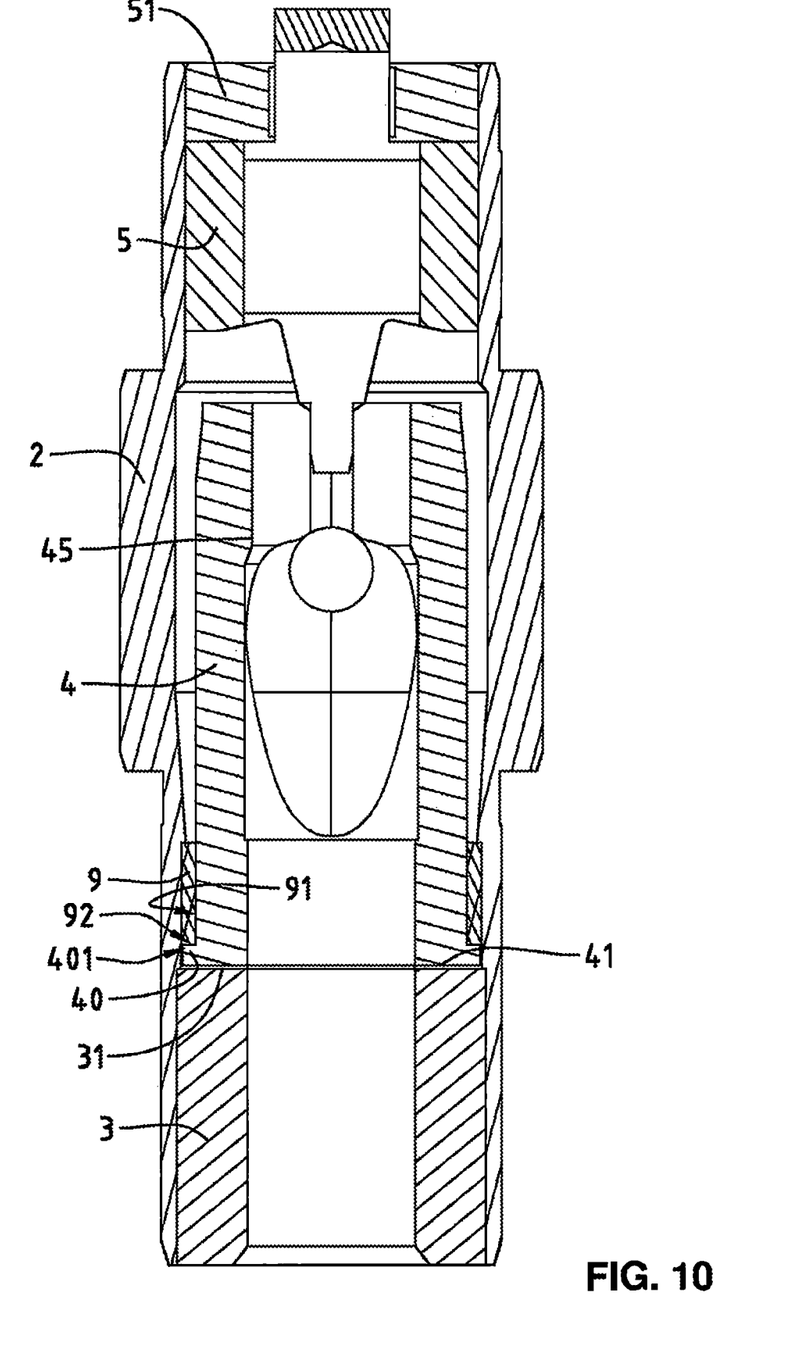
FIG. 10 shows a detail of a selective coupling mechanism according to still another preferred variant of the present invention according to the same sagittal sectional view as FIGS. 8 and 9.

FIGS. 8 to 10 show different preferred embodiments for a selective angular coupling mechanism ($C_s$) according to the invention using such a mode of coupling, using in particular radial surfaces between the clamp 4 and directly the drive shaft 2. For all these figures, the references common to all the usual pieces of the clamping device (in particular the drive shaft 2, plunger 5 and clamping stop 51, guide bush 3, clamp 4 and clamping jaws 45) and the coupling surfaces between the bush and the clamp will be introduced only for the description of FIG. 8, but not repeated for the subsequent figures.

FIG. 8 thus shows, for example, a drive shaft 2 in which a guide bush 3 is mounted, for instance by press-fitting or welding or soldering, and a clamp 4 whose clamping jaws 45 are able to be spread by a plunger 5, on which a clamping stop 51 is mounted as in the previously described configurations. An essential difference in this mode of coupling with respect to those previously described is that it no longer takes place between the guide bush 3 and the clamp 4, but directly between the drive shaft 2 and the clamp 4 owing to the presence of a radial clamping ring 9 which is preferably press-fitted in the drive shaft 2 or welded or soldered to the latter. This radial clamping ring 9, affixed on the axial end of the guide bush 3, requires a modification of the shape of the clamp, which then has a shoulder 43 coming to abut on the upper surface 93 of the radial clamping ring 9, while the inner surface of the radial coupling 91 co-operates by friction with the outer radial coupling surface 42 of the clamp 4. In this manner, not just an angular retaining couple C is ensured between the radial clamping ring 9 and the clamp 4, but an axial retention force is exerted in parallel to ensure their mutual engagement. For the sake of completeness, it will be noted that friction forces are likewise exerted at the upper coupling surface of the bush 31 and the lower coupling surface of the clamp 41; however, in view of the relationship of this surface to the radial clamping surfaces previously mentioned, the contribution of this friction could be considered negligible, along with that being produced at the coupling where the upper surface of the ring 93 serves to abut the lower shoulder of the clamp.

Consequently, to increase the friction surfaces, the embodiment illustrated in FIG. 9 proposes to add an additional radial clamping ring 9 above a peripheral radial bead 44 positioned above the first radial clamping ring 9 previously described; the shape of the lower surface 443 of this bead corresponds to the lower peripheral shoulder of FIG. 8, while the outer surface of the bead 442 is flush on the interior of the drive shaft 2. Here again, the coupling in rotation between the clamp 4 and the drive shaft 2—and thus at the same time the guide bush 3—is ensured by the co-operation through friction between the inner surface of radial coupling 91 and the outer surface of radial coupling 42 of the clamp 4, but from here on another instance of co-operation through friction is ensured between a second inner surface of radial coupling 91' of the additional radial clamping ring 9', it also being securely connected to the drive shaft 2. According to this preferred embodiment aiming to increase the friction surfaces, the hypothesis could be maintained that the contribution from the co-operation between the upper coupling surface of the bush 31 and the lower coupling surface of the clamp 41 to the angular holding torque C always remains negligible, likewise for that of the other surfaces of the two clamping rings 9 and 9' used. However, this solution presents the advantage of offering an axial stop for the positioning of the clamp 4 by means of the lower surface 92' of the additional radial clamping ring which is superimposed on the upper surface 441 of the peripheral radial bead 44; furthermore, such a variant, according to which the clamp 4 has a peripheral radial beaded shoulder 44 interposed between a first radial clamping ring 9 and an additional clamping ring 9', further improves the guiding of the clamp in the drive shaft 2.

For the clamping device relating to embodiments illustrated by FIGS. 8 and 9, the subassembly consisting of the said clamp 2, the guide bush 3 and the radial clamping ring 9 can be assembled outside the drive shaft 2 and then press-fitted in the latter in order to be able to check the characteristics of modular-type angular coupling.

Finally, FIG. 10 illustrates a variant according to which the clamp 4 is provided with a lower collar 40 wedged under the radial clamping ring 9, the lower surface of which 92 acts as an axial stop by coming to abut against the upper surface 401 of the lower collar 40. However, in a way similar to the preceding embodiments of FIGS. 8 and 9, the coupling in rotation between the clamp 4 and the drive shaft 2 is ensured by the co-operation through friction between the inner surface of radial coupling 92 of the radial clamping ring 9 and the outer surface of radial coupling 42 of the clamp 4.

According to non-illustrated variants, one or more seals of O-ring type could be introduced between the clamp 4 and the drive shaft 2 in order to replace or supplement the radial clamping ring 9 for the retention of the clamp 4 according to the needs.

Similarly, spring blades could be introduced (then press-fitted or welded or soldered or glued) in the drive shaft 2 (through openings machined beforehand in the drive shaft 2), and be brought into abutment on the outer surface of the clamp 4 to ensure the same function of retaining the clamp ensured by the radial clamping ring 9.

According to all the embodiments illustrated above relating to the clamping device, the clamp 4 can be coated, on the outer surface, with DLC (diamond-like carbon), acting as self-lubricating coating, which makes it possible to minimize friction and thus improve the service life. Moreover, the clamp 4 can be produced in an advantageous way when it is made of a flexible plastic material, by 3D printing, in order to optimize its geometric features.

In the preceding, a selective angular coupling mechanism $C_s$ has thus been described which makes possible:
- a reduction in mechanisms that cause attrition of the clamp;
- a reduction of the risk of accidental exit of the drilling tool 100 while the dentist is working.
- the possibility to increase the torque and the power of handpieces without reducing their reliability nor their service life.

Although the invention relating to this new improved clamping device with selective angular coupling mechanism $C_s$ between the clamp 4 and the guide bush 3 has been described in connection with distinct embodiments illustrated by the preceding sets of figures, it will be understood that a combination could be possible in particular of preferred embodiments relating modes of coupling between the guide bush 3 or respectively the drive shaft and the clamp 4, namely magnetic and respectively mechanical and that the integration of the clamping devices could be achieved alternatively in a turbine or a contra-angle according to the needs.

The invention claimed is:

1. A handpiece intended for dental or surgical applications, the handpiece comprising:
   a transmission rotor, and
   a drilling tool,
   wherein the transmission rotor comprises:
      an input element comprising a turbine or a drive pinion,
      an output element comprising a drive shaft rotatable about an axis of rotation, said drive shaft being adapted for actuating rotation of said drilling tool around said rotation axis, and
      a clamping device,
   said clamping device comprising a clamp disposed inside said drive shaft for axially securing said drilling tool with respect to said axis of rotation, said clamp being configured to cooperate with a plunger for release of said drilling tool, as well as a radial guide bush of said drilling tool, said plunger configured to rotate integrally with said drive shaft,
   said clamping device further comprising a coupler between said clamp and said guide bush, said coupler being configured to exert an angular holding torque between said clamp and said guide bush, a value of the angular holding torque being inferior to that corresponding to a slip threshold between said clamp and said drilling tool.

2. The handpiece according to claim 1, wherein the angular holding torque is between 4 mNm and 20 mNm.

3. The handpiece according to claim 1, said coupler between the said clamp and said guide bush being configured to use magnetic coupling between said clamp and said guide bush, wherein the guide bush is integral in rotation with the drive shaft.

4. The handpiece according to claim 3, said clamp being made of a passive ferromagnetic material and said guide bush comprising a permanent magnet.

5. The handpiece according to claim 4, the angular holding torque between said clamp and said guide bush resulting moreover from friction between a lower axial coupling surface of said clamp and an upper axial coupling surface of said guide bush.

6. The handpiece according to claim 3, said clamp being made of a passive ferromagnetic material, and said guide bush being surmounted by a magnetized coupling ring.

7. The handpiece according to claim 6, the angular holding torque between said clamp and said guide bush resulting moreover from friction between a lower axial coupling surface of said clamp and an upper axial coupling surface of said magnetized coupling ring.

8. The handpiece according to claim 1, said coupler comprising a radial clamping ring configured to use frictional coupling between said drive shaft and said clamp, a radial coupling surface of said clamping ring being in contact with an outer radial coupling surface of said clamp.

9. The handpiece according to claim 8, said clamp having a peripheral radial beaded shoulder interposed between said radial clamping ring and an additional clamping ring.

10. The handpiece according to claim 1, said plunger being provided with a radial peripheral shoulder, and being surmounted by a clamping stop mounted in a way free in rotation in the drive shaft.

11. The handpiece according to claim 1, said plunger comprising an upper part, integral in rotation, of said drive shaft, and a lower conical part being configured to cooperate with said clamp free in rotation inside said drive shaft.

12. The handpiece according to claim 1, said clamp being covered, on its outer surface, by a self-lubricating coating.

13. The handpiece according to claim 12, said self-lubricating coating comprising DLC.

14. The handpiece according to claim 1, said clamp being made of plastic material using 3D printing.

* * * * *